(12) United States Patent
Yifan (10) Patent No.: US 6,442,535 B1
(45) Date of Patent: Aug. 27, 2002

(54) METHOD AND APPARATUS FOR IMPLEMENTING A LOW COST, INTELLIGENT CONTROLLER FOR A SWITCHED RELUCTANCE MACHINE

(75) Inventor: Tang Yifan, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/181,535

(22) Filed: Oct. 28, 1998

(51) Int. Cl.[7] ................................................. G06N 7/02
(52) U.S. Cl. ............................ 706/4; 310/165; 310/168
(58) Field of Search ................................. 310/168, 183, 310/165, 175; 318/701; 706/4

(56) References Cited

U.S. PATENT DOCUMENTS

| | | | | |
|---|---|---|---|---|
| 5,272,428 A | * | 12/1993 | Spiegel et al. | 318/803 |
| 5,717,269 A | * | 2/1998 | Tang | 310/168 |
| 5,811,905 A | * | 9/1998 | Tang | 310/179 |
| 5,838,087 A | * | 11/1998 | Tang | 310/168 |
| 5,841,262 A | * | 11/1998 | Tang | 318/701 |
| 5,889,347 A | * | 3/1999 | Tang | 310/165 |
| 5,929,590 A | * | 7/1999 | Tang | 318/701 |
| 6,008,561 A | * | 12/1999 | Tang | 310/183 |

OTHER PUBLICATIONS

Haykin, Simon; Neural Networks: A Comprehensive Foundation; IEEE Press; Macmillan Publishing Company, Englewood Cliffs, NJ, 1994, pp. 498–499, Jun. 1990.*
Kuo, Benjamin C., Automatic Control Systems: Fifth Edition, 1987, pp. 160–161 and 475, Jan. 1987.*
Reay, D.S.; Mirkazemi–Moud, M.; Williams, B.W., On the appropriate uses of fuzzy systems: fuzzy sliding mode position control of a switched reluctance motor, Intelligent Control, 1995., Proceedings of the 1995 IEEE International Symposium on, 1995, Page, Jan. 1995.*

Reay, D.S.; Dunnigan, M.W.; Mirkazemi–Moud, M.; Williams, B.W., A comparison between fuzzy and linear controllers applied to a switched reluctance motor based position servo, advances in Control Systems for Electric Drives, IEE Colloquium on, 1995, Page, Jan. 1995.*

Rodrigues, M.G.; Suemitsu, W.I.; Branco, P.; Dente, J.A.; Rolim, L.G.B., Fuzzy logic control of a switched reluctance motor Industrial Electronics, 1997. ISIE '97., Proceedings of the IEEE International Symposium on, vol.: 2,7–11 Jul. 1997, pp.: 52, Jul. 1997.*

Inanc, N.; Derdiyok, A.; Ozbulur, V. Fuzzy logic control of a switched reluctance motor including mutual inductances and operating in the linear region, Intelligent Control, 1997. Proceedings of the 1997 IEEE International Symposium on, Jul. 16–18, 1997, Jul. 1997.*

Cheok, A.; Ertugrul, N., A model free fuzzy logic based rotor position sensorless switched reluctance motor drives, Industry Applications Conference, 1996. Thirty–First IAS Annual Meeting, IAS '96., Conference Record of the 1996 IEEE vol.: 1, Oct. 6–10, 1996.*

(List continued on next page.)

Primary Examiner—Mark R. Powell
Assistant Examiner—Wilbert Starks
(74) Attorney, Agent, or Firm—Howrey Simon; Arnold & White LLP (57) ABSTRACT

A controller for a switched reluctance machine utilizing a feedforward neural network in combination with either a fuzzy logic controller or a proportional-integral controller to provide output control signals (e.g., turn-ON angle, turn-OFF angle and peak current) for controlling the energization of a switched reluctance machine. In an alternate embodiment, a fuzzy logic controller is utilized by itself to control a switched reluctance machine.

17 Claims, 10 Drawing Sheets

OTHER PUBLICATIONS

Sharma, V.K.; Singh, B.; Murthy, S.S.; Chandra, A.; Al–Haddad, K., Performance analysis of fuzzy logic based speed controller for switched reluctance motor drive Power Electronics, Drives and Energy Systems for Industrial Growth, 1996., Proceedings of the Jan. 1996.*

Bolognani, S.; Zigliotto, M., Fuzzy logic control of a switched reluctance motor drive, Industry Applications Society Annual Meeting, 1993., Conference Record of the 1993 IEEE , Oct. 2–8, 1993, pp.: 2049–2054 vol. 3.*

Bolognani, S.; Zigliotto, M., Fuzzy logic control of a switched reluctance motor drive, Industry Applications, IEEE Transactions on, vol.: 32 5, Sep.–Oct. 1996, pp.: 1063–1068.*

De Azevedo, H.R.; Borges, T.T.; Salvador, N.; Teixeira, E.P., Reluctance motor drive based on fuzzy logic, Intelligent Information Systems, 1995. ANZIIS–95. Proceedings of the Third Australian and New Zealand Conference on, Nov. 27, 1995, pp.: 226–231.*

Abut, N.; Cakir, B.; Inanc, N.; Yildiz, A.B.; Bilgin, M.Z., Switched reluctance motor drive by using fuzzy controller, Industrial Electronics, Control and Instrumentation, 1997. IECON 97. 23rd International Conference on, vol.: 1, Nov. 9–14, 1997, Page, Jun. 1990.*

Bradford, J.N.; Xin Feng, A new approach to the nonlinear fuzzy control of the switched reluctance motor, Systems, Man and Cybernetics, 1995. Intelligent Systems for the 21st Century., IEEE International Conference on, vol.: 1, Oct. 22–25, 1995, Page(s.*

Uk–Youl Huh; Tae–Gyoo Lee, Fuzzy logic based switching angle controller for SR motor speed control, Industrial Electronics, 1995. ISIE '95., Proceedings of the IEEE International Symposium on, vol.: 2, Jul. 10–14, 1995 , pp.: 809–814 vol. 2.*

Reay, D.S.; Green, T.C.; Williams, B.W., Field programmable gate array implementation of a neural network accelerator, Hardware Implementation of Neural Networks and Fuzzy Logic, IEE Colloquium on , pp.: 2/1–2/3, Jan. 1994.*

Abut, N.; Cakir, B.; Akca, U.; Erturk, N., Fuzzy control application of SR motor drive for transportation systems, Intelligent Transportation System, 1997. ITSC '94., IEEE Conference on, Nov. 9–12, 1997, pp.: 135–140.*

Borges, T.T.; de Azevedo, H.R.; de Andrade, D.A.; Goncalves, C.S., An application of fuzzy logic for reluctance motor drive, Electric Machines and Drives Conference Record, 1997. IEEE International, May 18–21, 1997 , pp.: TB1/10.1–TB1/10.3.*

Iwata, T.; Machida, K.; Toda, Y., Fuzzy control using neural network techniques, Neural Networks, 1990., 1990 IJCNN International Joint Conference on , Jun. 17–21, 1990, pp.: 365–370 vol. 3.*

Stiebler, M.; Gotovac, S., A switched–reluctance servo drive, Power Electronics and Applications, 1993., Fifth European Conference on , pp.: 436–441 vol. 5, Jan. 1993.*

Reay, D.S.; Mirkazemi–Moud, M.; Green, T.C.; William, B.W., Fuzzy adaptive systems applied to the control of a switched reluctance motor, Intelligent Control, Proceedings of 1994 IEEE International Symposium on , pp.: 81–86, Jan. 1994.*

Reay, D.S.; Mirkazemi–Moud, M.; Green, T.C.; Williams, B.W., Switched reluctance motor control via fuzzy adaptive systems, IEEE Control Systems Magazine vol.: 15 3, Jun. 1995, pp.: 8–15.*

Jun. 1990.*

* cited by examiner

LEGEND:
− − − − − − : FOR INPUT FUZZY SETS
− · − · − · − : FOR OUTPUT FUZZY SETS

MEMBERSHIP FUNCTION $\mu_{A_1^1}(a_1)$ $A_1^1$  $A_1^2$  $A_1^3$  $A_1^4$  $A_1^5$  $A_1^6$  $A_1^7$ $-w_1$   0   $w_1$ ( TO BE NORMALIZED )

| | | INPUT No. 1 | | | | | | |
|---|---|---|---|---|---|---|---|---|
| | OUTPUT | NL | NM | NS | ZE | PS | PM | PL |
| INPUT No. 2 | NL | PL | PL | PL | PM | PM | PS | ZE |
| | NM | PL | PL | PM | PM | PS | ZE | NS |
| | NS | PL | PM | PM | PS | ZE | NS | NM |
| | ZE | PM | PM | PS | ZE | NS | NM | NM |
| | PS | PM | PS | ZE | NS | NM | NM | NL |
| | PM | PS | ZE | NS | NM | NM | NL | NL |
| | PL | ZE | NS | NM | NM | NL | NL | NL |

METHOD AND APPARATUS FOR IMPLEMENTING A LOW COST, INTELLIGENT CONTROLLER FOR A SWITCHED RELUCTANCE MACHINE

FIELD OF THE INVENTION

This invention relates to the field of electronic controllers for controlling a switched reluctance machine.

BACKGROUND OF THE INVENTION

Electric motors turn electrical energy into mechanical energy to produce work. Electric motors work by applying a voltage across one or more inductors, typically a machine winding, thereby energizing the inductor(s) to produce a resultant magnetic field. Mechanical forces of attraction or repulsion caused by the magnetic field cause a rotor in an electric motor to move. The efficiency of the electrical motor depends in part on the timing and magnitude of each application of voltage to the motor. Timing of the voltage being applied is particularly important in the case of switched reluctance motors.

Historically, the switched reluctance motor was thought to be incapable of competing effectively with other types of motors. More recently, however, a better understanding of motor design and the application of electronically controlled switching has resulted in a robust switched reluctance drive capable of high levels of performance over a wide range of sizes, powers and speeds. Note that the term 'motor' is used here, but it will be appreciated by those skilled in the art that the term covers the same machine in a generating mode unless a particular distinction is made.

The switched reluctance motor is generally constructed without conductive windings or permanent magnets on the rotating part (called the rotor) and includes electronically-switched windings carrying unidirectional currents on the stationary part (called the stator). Commonly, pairs of diametrically opposed stator poles may be connected in series or parallel to form one phase of a potentially multi-phase switched reluctance motor. Motoring torque is developed by applying voltage to each of the phase windings in a predetermined sequence that is synchronized with the angular position of the rotor so that a magnetic force of attraction results between poles of the rotor and stator as they approach each other. Similarly, generating action is produced by positioning the voltage pulse in the part of the cycle where the poles are moving away from each other.

The general theory of design and operation of switched reluctance motors is well known and discussed, for example, in *The Characteristics Design and Applications of Switched Reluctance Motors and Drives*, by Stephenson and Blake and presented at the PCIM '93 Conference and Exhibition at Nuremberg, Germany, Jun. 21–24, 1993.

The control of the torque of a switched reluctance machine (and hence speed and rotor position) is made possible by the positioning and wave-shaping of the excitation currents in the motor windings with respect to the rotor positions. In certain known switched reluctance machine systems, the positioning and shaping of the excitation currents is controlled through the use of peak current values and turn-ON and turn-OFF angles where: (i) a peak current value represents a desired peak current level over a given interval of rotor rotation; (ii) a turn-ON angle defines a point during the rotor's rotation when voltage is applied to the phase winding (referred to as the "turn-ON angle"); and (iii) a turn-OFF angle defines a point during the rotor's rotation when the application of voltage to the winding is halted. Various control schemes (e.g., pulse width modulation, bang-bang current chopping and others) may be used to control the voltage that is applied to a phase winding during the intervals defined by the turn-ON and turn-OFF angles for that phase winding.

The relationships of the control inputs for a switched reluctance machine system (e.g., turn-on angles, turn-off angles, current levels, current wave-shapes, etc.) with the outputs (speed, torque, rotor position, etc.) are complicated, and a full utilization of all the control inputs to maximize performance represents a non-linear many-to-many mapping problem that is difficult for conventional control design. As such, in known switched reluctance motor systems, this complex relationship is typically implemented through the use of a relatively complex circuit that stores signals representative of the relationship between the speed, torque demand, and turn-ON and turn-OFF angles of the motor. Circuits of this type are commonly referred to as "control law tables."

In many known controllers for switched reluctance motors, the control law table comprises a circuit that includes turn-ON and turn-OFF angle information for various rotor speed and torque demand combinations. In most systems, the information that is stored in the control law table is derived empirically through a process commonly known as "characterization" in which the appropriate turn-ON and turn-OFF angles required to produce the torque demand are determined for a number of different rotor speeds. The empirically derived information is then stored in the control-law table, sometimes together with information from non-tested speeds and torque demands which has been interpolated from the empirically derived information.

One disadvantage of conventional controllers that use control law tables is the necessity of providing for the control law circuitry. For a switched reluctance machine system that works in a wide speed range and a wide torque range and for stability purpose, the control law table must be densely populated, which means that a large data memory is needed. Moreover, because each control law table is the result of the characterization of a particular switched reluctance machine, a control law based controller is a motor-specific controller and cannot be properly used with other switched reluctance machines having designs and sizes different from the machine used to generate the data in the control law table. As such, control law based controllers adds to the cost and time required to develop a new control system, in that, the process of characterizing the machine used in the system may be required for each new motor and controller.

The present invention provides a circuit and a method for controlling a switched reluctance motor without the use of large, costly control law tables. The present invention also provides a compact and generalized controller and control technique for intelligent control of a switched reluctance machine that satisfies desired control requirements and that has lower development and construction costs and better performance than conventional switched reluctance controllers and control techniques.

SUMMARY OF THE INVENTION

Aspects of the present invention provide a compact and generalized technique for intelligent control of a switched reluctance machine that can be easily implemented in a low cost digital signal processor or microcontroller. Such aspects of the present invention allow for the construction of a low-cost high-performance controller.

In accordance with one embodiment of the present invention, a controller for a switched reluctance machine is provided that includes a fuzzy-logic control circuit that: (i) receives as an input a signal representing the difference between a desired operating characteristic of the switched reluctance machine and the actual operating characteristic of the switched reluctance machine; and (ii) provides at its output an intermediate control signal corresponding to the desired output torque of the reluctance machine; and (iii) a multi-layer neural network circuit that receives at its input the intermediate control signal from the fuzzy-logic control circuit and a signal representing the rotational speed of the switched reluctance machine and provides at its output control signals for controlling energization of the switched reluctance machine.

In accordance with another embodiment of the present invention, a controller for a switched reluctance machine is provided that includes a proportional-integral control circuit that receives as input a speed error signal representing the difference between the desired operating speed of the switched reluctance machine and the operating speed of the switched reluctance machine, the proportional-integral controller providing output signals that is the sum of a component proportional to the input and a component proportional to the integral of the input; and a multi-layer neural network circuit that receives at one input the outputs from the proportional-integral control circuit and at another input a signal representing the rotational speed of the switched reluctance machine, the neural network providing at its output control signals for controlling energization of the switched reluctance machine.

In accordance with yet another embodiment of the present invention, a fuzzy logic control circuit for controlling the energization of a switched reluctance machine is provided where the control circuit includes fuzzification means for receiving a signal corresponding to the difference between a desired output characteristic of the switched reluctance machine and the actual output characteristic of the machine and for generating a fuzzy set representing the input signal; a knowledge-based fuzzy inference engine that receives at its inputs the fuzzy set generated by the fuzzification means, the inference-engine generating a fuzzy output control set utilizing a rule-base that corresponds to the general operating characteristics of switched reluctance machines; and de-fuzzification means for receiving the output of the fuzzy inference engine and providing output control signals for controlling the energization of the switched reluctance machine.

Other exemplary embodiments of the present invention and other features of the present invention will be apparent to one of ordinary skill in the art having the benefit of this disclosure.

DETAILED DESCRIPTION OF THE INVENTION

Figure 1:
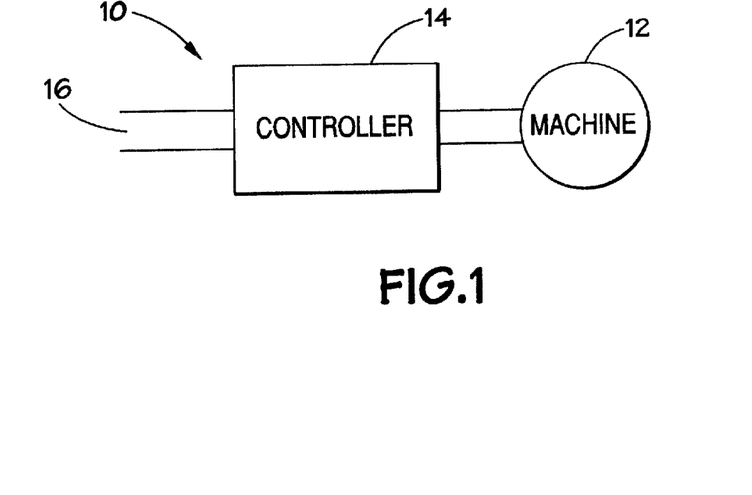
FIG. 1 illustrates a reluctance machine and a machine controller constructed according to aspects of the present invention.

Turning to the drawings and, in particular, to FIG. 1, a switched reluctance machine system 10 is disclosed. The system 10 includes a switched reluctance machine 12 and a machine controller 14. The switched reluctance machine comprises a stationary stator defining a number of salient stator poles, and one or more phase windings wound about the poles. The machine 12 also includes a rotor defining a number of rotor poles that is adapted to rotate relative to the stator when electric power is supplied to the phase windings of the machine 14. The precise construction of the switched reluctance machine 12 (e.g., in terms of the number of stator and rotor poles, the number of phase windings, or the size of the machine) is not essential to the present invention. In general, any switched reluctance machine may be used to practice and implement the subject matter described herein.

Figure 2:
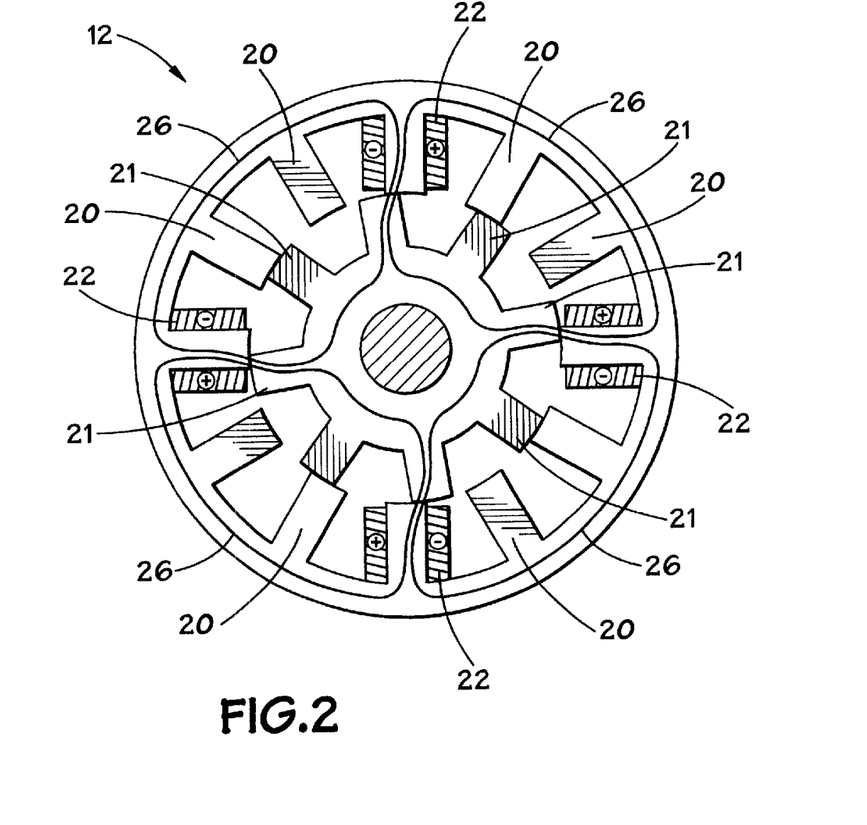
FIG. 2 illustrates one embodiment of a switched reluctance machine that may be used in the system of FIG. 1.

FIG. 2 illustrates one embodiment of switched reluctance machine 12 that includes twelve stator poles 20, eight rotor poles 21 and three phase windings. The winding configuration for only one phase is shown to have four of its coils 22 surrounding four stator poles, and the other two phases are just displaced by one or two stator pole pitches. When the stator pole group of a phase is not aligned to rotor poles, coils of the phase can be excited by applying electric power to the coils to create a magnetic flux path through the excited stator poles, air-gaps and the nearest rotor poles. The flux path established by the energization of the phase coils 22 with the rotor in the illustrated position are generally illustrated by lines 26. Due to the tendency for the reluctance of the flux path to minimize, the rotor poles are attracted to these stator poles, hence torque is produced. Then when the rotor poles become aligned or nearly aligned with these stator poles, excitation to the active coils is removed so that torque is not produced in the reversed direction; instead, the coils of the adjacent stator poles that belong to the second phase are excited so that the rotor poles are attracted to the second group of stator poles, since they are not aligned.

By selectively exciting the stator pole group to attract rotor poles, continuous motion and continuous torque are produced.

Referring back to FIG. 1, machine controller 14 receives electric power from a power source such as the power utility (not shown) through input power lines 16, and applies such electric power to the phase windings of the switched reluctance machine 12 in a controlled manner so as to control the operation of the machine 12. The controller 14 may be used to control the output torque of machine 12 or, alternatively, the rotational speed of the rotor of machine 12 or the position of the rotor of machine 12.

Figure 3A:
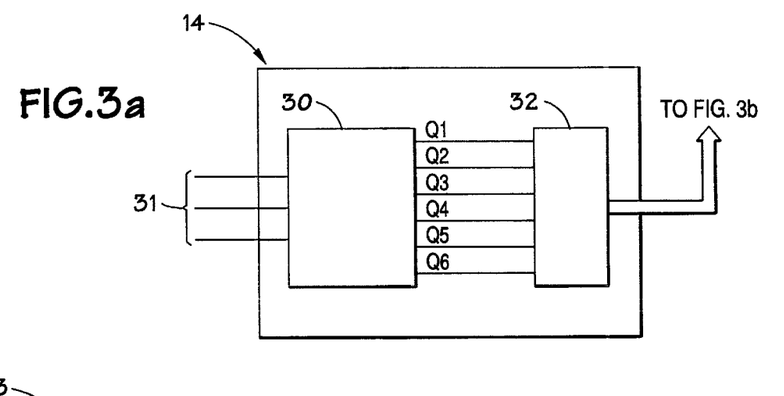
FIGS. 3a–3b illustrate in greater detail one exemplary construction of a controller that may be used to construct the system of FIG. 1.

FIGS. 3a and 3b illustrate in greater detail one exemplary construction of controller 14. Referring to FIG. 3a, the illustrated controller includes a control board containing a data processor having memory 30. The data processor 30 receives as inputs various command control signals (e.g., desired speed, desired torque, etc.) and feedback signals (actual speed, actual torque, rotor position, etc.) on input lines 31. The control and feedback signals may be preprocessed (e.g., amplified, converted from analog to digital or from serial to parallel) before being provided to the data processor 30 by circuit elements not illustrated in FIG. 3a. Data processor 30 may be constructed using any of a number of microcontrollers, microprocessors, application-specific integrated circuits and other devices that may be constructed and/or programmed to digitally implement the control techniques described herein. The selection and programming such a data processor 30 will be apparent to those of ordinary skill in the art having the benefit of this disclosure.

As will be described below, the data processor 30 processes the input signal to generate control signals in the form of gate drive signals that are used to control the application of electric power to the phase windings of the electric machine. In the illustrated example, the data processor 30 generates gate drive signals Q1, Q2, Q3, Q4, Q5 and Q6 that are applied to gate drivers. Gate drivers 32 convert the gate drive signals from the data processor 30 into drive signals suitable for controlling the conductivity of power semiconductor switching devices such as those illustrated in FIG. 3b.

Figure 3B:
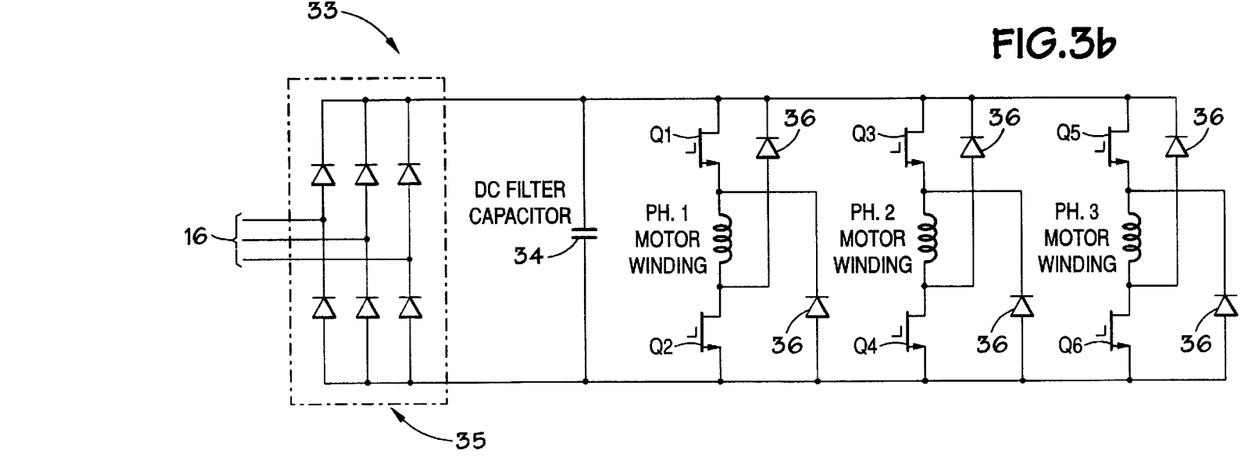

Referring to FIG. 3b, a power control circuit 33 for controlling the application of electric power to the phase windings of the switched reluctance machine 12 is illustrated. As illustrated, the power control circuit includes a rectifier 35 that receives input power through power lines 16. The rectifier circuit 35 converts the input power (which in the illustrated embodiment is in the form of AC power) into DC power that is regulated to some extent by a DC bus capacitor 34. Each phase winding of the switched reluctance machine 12 is coupled to the DC bus through semiconductor switching devices Q1–Q6 (e.g., semiconductor switching devices such as MOSFETS, IGBTs, etc.) and two diodes 36 (both in serial with the phase winding). The control inputs to the switches Q1–Q6 are coupled to the outputs from the data processor 30 to control the state of the switches. The switches Q1–Q6 may be placed in a conductive (or "ON") state or a non-conductive (or "OFF") state.

For each phase winding, the state of its associated switches determines the energization of the phase winding: turning on the switch pair puts current in the connected winding, while turning off the switch pair removes current through the pair of free-wheeling diodes. The turning on of one switch and the turning off of the other allows current to freewheel through the phase winding and the conductive switch. In the illustrated embodiment, the turning on and off instants of the phase winding are synchronized by data processor 30 with the rotor position. The rotor position may be either directly measured by an optical or hall-effect magnetic sensor or calculated by an estimation algorithm using voltage and current measurements or utilizing other approaches for measuring, calculating or estimating rotor position as is known in the art. Alternate embodiments are envisioned, where the turning on and turning off instances are not synchronized with actual or calculated rotor positions and the instances are determined without reference to actual rotor position.

Figure 4:
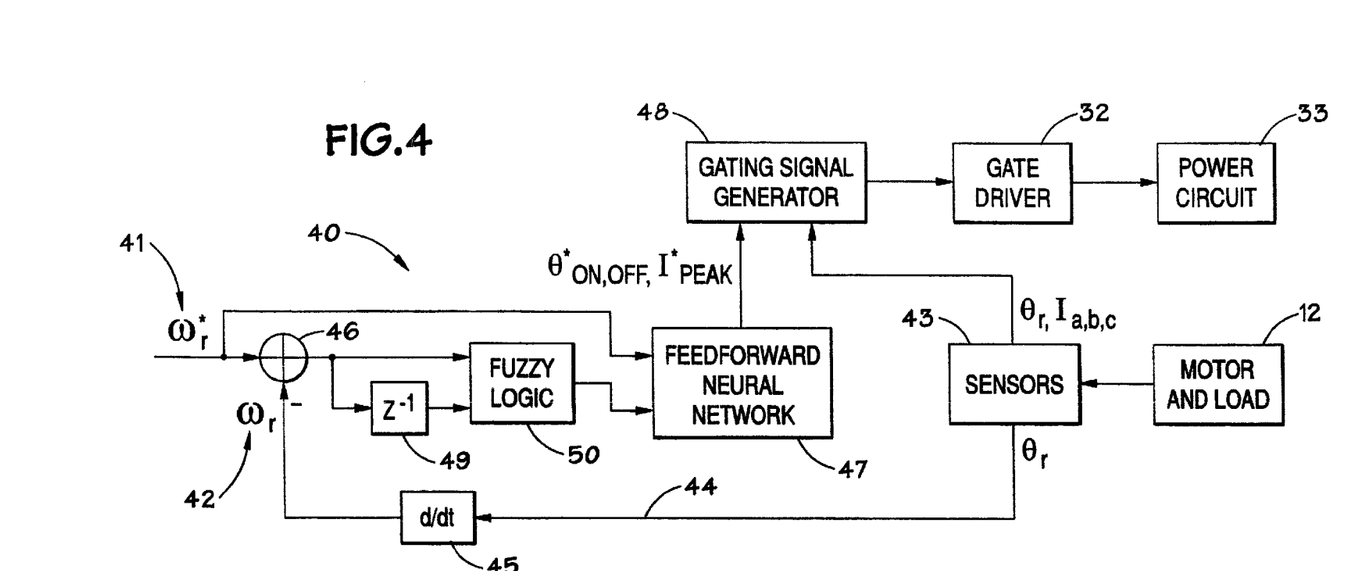
FIG. 4 illustrates, in functional block form, the operation of one novel control approach that may be implemented in a data processor forming part of the controller of FIGS. 3a and 3b.

As described above, the data processor 30 is programmed to implement a novel control technique corresponding to certain aspects of the present invention. FIG. 4 illustrates, in functional block form, the operation of one novel control approach that may be implemented in data processor 30. The functions represented by the various blocks of FIG. 4 may be implemented through appropriate programming of data processor 30 or through appropriate hardware. The implementation of the function blocks in FIG. 4 through software (programming of a data processor) or hardware (discrete circuit components) will be within the abilities of those of ordinary skill having the benefit of this disclosure.

Referring to FIG. 4, the illustrated control system 40 receives as inputs a desired speed signal 41 and a signal 42 representing the actual rotational speed of the switched reluctance machine 12. The signal 42 representing the actual rotational speed of the switched reluctance machine 12 is derived from the output of a sensor set 43. In the illustrated embodiment, the sensor set 43 includes a rotor position detector or rotor position estimator for providing an output 44 representing the angular position of the rotor relative to the stator. The precise form of the rotor position detector (or rotor position estimator) is not critical and any appropriate sensor or method may be used to provide the rotor position signal 44.

In the illustrated embodiment, the rate of change of the rotor position signal 44 is determined by function block 45 to provide signal 42 that, as described above, corresponds to the actual rotational speed of the rotor.

In the illustrated embodiment, sensor set 43 also includes current sensors coupled to the phase windings of reluctance machine 12. These current sensors provide output signals Ia, Ib, Ic that correspond to the currents in the various phase windings. Any appropriate current sensors may be used.

As illustrated in FIG. 4, the signal 42 representing the actual rotational speed of the rotor is compared to a signal 41 representing the desired rotational speed of the motor at comparator 46 to provide at the output of the comparator a speed error signal. The speed error signal is applied as one input to fuzzy logic block 50. The speed error signal is also applied to a trending block 49 that provides at its output a signal corresponding the trend of the speed error signal over time. The trend output from trending block 49 is applied as a second input to fuzzy logic block 50.

In the illustrated embodiment, fuzzy logic block 50 follows a two-input single-output design where the two inputs correspond to the speed error and its trend as described above and the output corresponds to a torque demand signal. In general, the construction of the fuzzy logic block 50 may follow general fuzzy logic controller structure as described in, for example, L. Tsoukalas, R. Urig, *Fuzzy and Neural Approaches in Engineering*, John Wiley & Sons, Inc. (1997). While a general fuzzy logic structure may be used to implement fuzzy logic block 50, the fuzzy logic rules and fuzzification/de-fuzzification methods are preferably based on the dynamic characteristics of a switched reluctance machine.

Figure 5A:
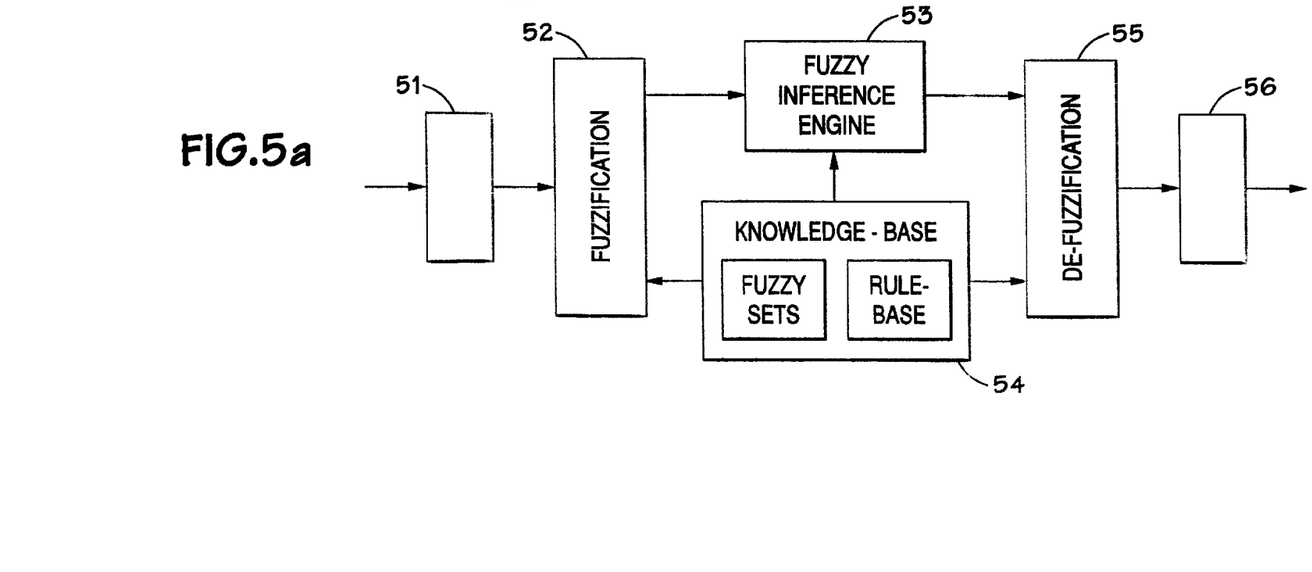
FIGS. 5a–5c provide a detailed illustration of one of the constructions of an embodiment of a fuzzy logic block that may be used to implement the control approach of FIG. 4.

FIG. 5a provides a more detailed illustration of one embodiment of the fuzzy logic block 50. Referring to FIG. 5a, the inputs to the fuzzy logic block 50 are applied to a normalizing block 51. Normalizing block 51 is utilized in the illustrated embodiment because the knowledge-base for the fuzzy logic block 50 was developed using scaled data. The normalization block 51 should be selected to accommodate the differences between the reluctance machine 12 to which controller 14 is coupled and the scaled data used to develop the knowledge base of the fuzzy logic block.

Once the input signals are normalized by normalizing block 51 they are applied as inputs to fuzzification block 52.

Figure 5B:
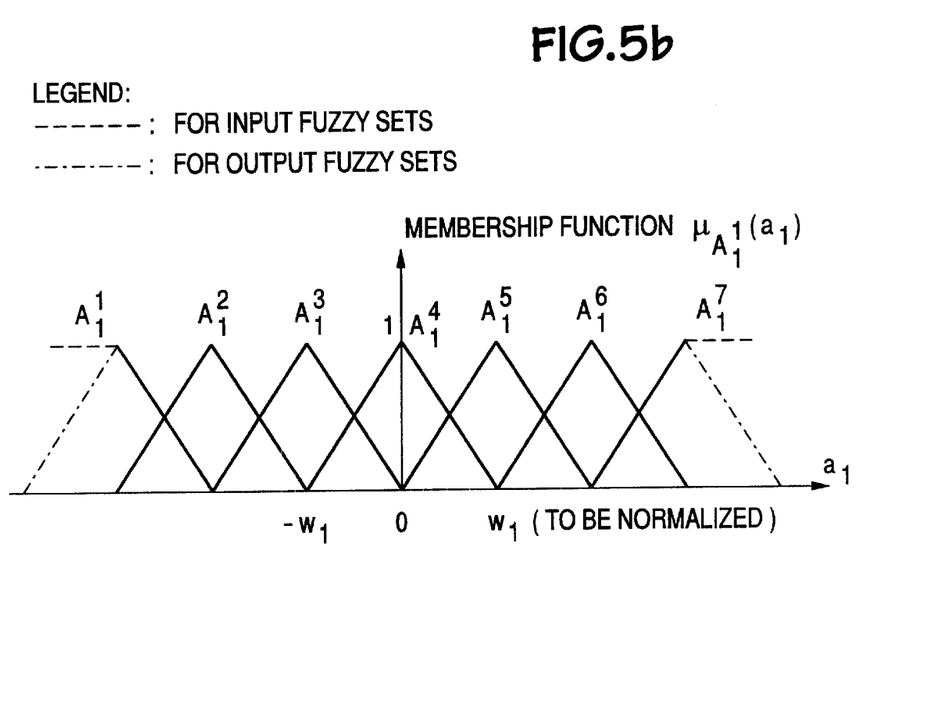

Fuzzification block 52 "fuzzifies" the input signals using any appropriate fuzzification method. One method that may be used to fuzzify the input signals is the singleton fuzzification method which interprets an input as a fuzzy set with the membership function equal to zero except at the point where the membership function equals one. This fuzzification method may be used with standard triangular membership functions such as those illustrated in FIG. 5*b*. From left to right, the exemplified fuzzy sets that have triangular membership functions have the linguistic values of "NEGATIVE LARGE," "NEGATIVE MEDIUM," "NEGATIVE SMALL," "ZERO," "POSITIVE SMALL," "POSITIVE MEDIUM," "POSITIVE LARGE," respectively. For the inputs, the two fuzzy sets at both ends have an open membership function range extending to infinity while for the output the two fuzzy sets at both ends have a closed membership function range since the output (i.e., desired output torque) has a limited range.

Figure 5C:
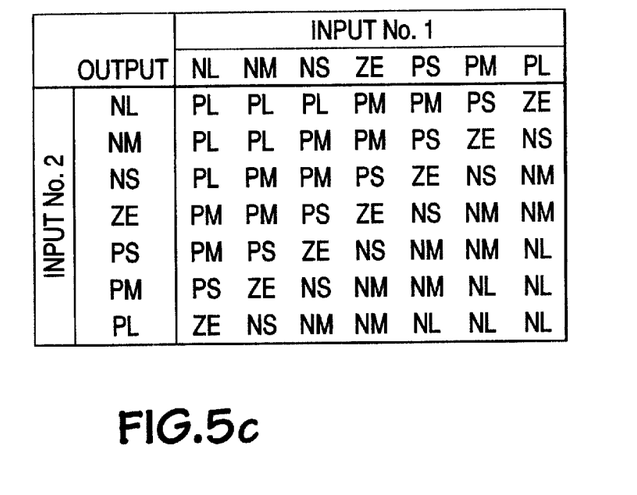

The output of fuzzification block 52 is a fuzzy set that is applied as an input to fuzzy inference engine 53. The fuzzy inference engine utilizes conventional fuzzy logic techniques and fuzzy rules provided by a knowledge base 54 to generate a fuzzy output set that is applied to a defuzzification block 55. The fuzzy rules from knowledge base 54 are based on the characteristics of a switched reluctance machine. One exemplary set of such fuzzy rules is provided in FIG. 5*c*, which are fuzzy rules that may be utilized with various variable speed rotating machines. The linguistic values of the fuzzy sets are used in the fuzzy rule table in FIG. 5C, including NL (Negative Large), NM (Negative Medium), NS (Negative Small), ZE (Zero), PS (Positive Small), PM (Positive Medium), PL (Positive Large). Therefore, as an example, the first entry in the table reads: If input #1 is NL and input #2 is NL, then output is PL. The use of fuzzy rules, such as are illustrated in FIG. 5*c* to implement a fuzzy logic function, is described in greater detail in Tang and Xu, *Fuzzy Logic Application for Intelligent Control of a Variable Speed Drive,* IEEE/PES (1994, Winter/New York).

The fuzzy output set from fuzzy inference engine 53 is applied as an input to defuzzification block 55 which converts the fuzzy output set to a single desired torque output signal. In the illustrated embodiment, the defuzzification block 55 utilizes a standard Center of Gravity defuzzification method to provide the appropriate torque demand output signal. The torque output signal from defuzzification block 55 may be de-normalized in de-normalization block 56 to provide a de-normalized torque demand signal that more closely relates to the torque production range of the controlled motor and represents a torque that is achievable.

Referring back to FIG. 4, the torque demand output from fuzzy logic block is one input to a feedforward neural network 47. A second input to the feedforward neural network 47 is either the speed demand signal or the actual speed signal. The choice between the two signals has less effect on the machine performance in steady-state, while in the transient-state, generally the use of the speed demand signal results in faster dynamics while the use of the actual speed signal results in better stability. In general, neural network 47 receives the speed signal (either speed demand signal or actual speed signal) and torque demand signals and provides at its output signals corresponding to appropriate turn-ON and turn-OFF angles and a desired peak current value. The turn-ON, turn-OFF and peak current signals are then applied to a gating signal generator 48 that also receives as an input the rotor position and phase current information from sensor set 43. The construction and operation of gating signal generator 48 may utilize conventional switched reluctance control circuits for receiving rotor position, turn-ON, turn-OFF, peak current, and actual phase current information and generating gating signals Q1–Q6. The gating signals from the gating signal generator 48 are applied to gate drivers 32 to control the application of electric power by power circuit 33 to the phase windings as described above. The construction of gating signal generator 48 is well within the ability of those of ordinary skill in the art having the benefit of this disclosure and will not be further discussed herein.

Figure 6A:
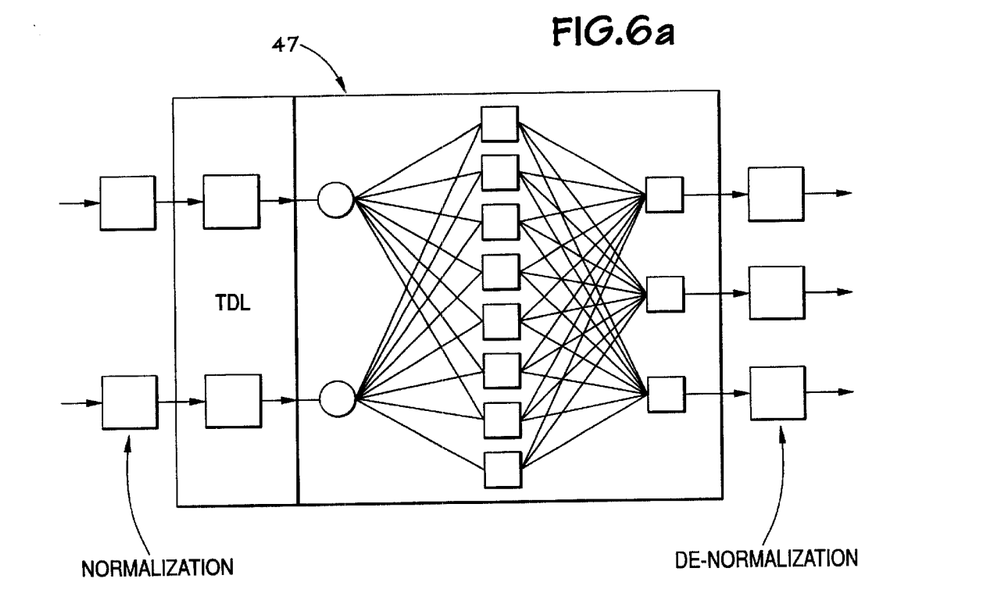
FIGS. 6a–6c illustrate components that may be used to form a neural network that may be used to implement the control approach of FIG. 4.

FIG. 6*a* generally illustrates the construction of an exemplary neural network 47 that may be used to implement one controller constructed according to teachings of the present invention. Referring to FIG. 6*a* the illustrated neural network comprises three parts: normalizing of inputs and de-normalizing of outputs, tapped delay line that allows for adaptive filtering of the input signals to the neural network, the basic neural network. The normalization adjusts for the speed range and torque range of the controlled motor, and the de-normalization adjusts for the ranges of the control angles and the range of the peak current of the controlled motor.

Figure 6B:
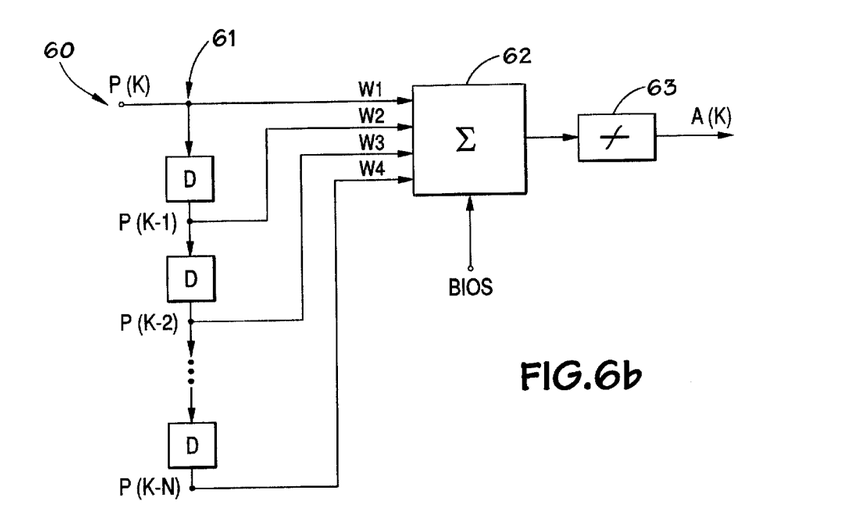

The tapped delay line forms a type of finite impulse response filter that may be used to improve the performance of the neural network 47. FIG. 6*b* generally illustrates an exemplary tapped delay line 60 that may be used to form the first part of neural network 47. Although only one tapped delay line 60 is illustrated, it will be appreciated that a tapped delay line may exist for each of the inputs to the neural network 47. Referring to FIG. 6*b*, the tapped delay line includes a first delay layer 61 that provides delayed input signals where the number of delayed input signals corresponds to the number of delay elements in delay layer 61. The outputs from each delay element are then multiplied by varying weighting factors to produce weighted output delayed signals. While the weighting factors may be selected according to any appropriate process, in general the weighting factors for the present and more recent input signals should be greater than those for more distance signals. Alternately, the weighting factors may be selected through the use of training process akin to those used to train neural networks. The weighted output delayed signals are all applied to a summing block 62 that sums the various signals. A bias may be added as an input to the summing block to allow for easy tuning or adjustment of the tapped delay line 60.

The output of the summing block 62 may be applied to a transfer function block 63 to implement an appropriate transfer function to produce an adaptively filtered input for application to the basic portion of the neural network.

While the embodiment of FIGS. 6*a*–6*b* utilizes a tapped delay line as described above, it should be understood that alternate embodiments may eliminate the tapped delay line and apply the torque demand and speed signals directly to a structure such as that described herein as the basic portion of neural network 47.

While the precise construction of the basic portion of neural network 47 (referred to hereafter as the "neural network") may vary, preferably, it is designed and constructed by following the following process: (1) select a topology for the neural network; (2) design the neural network and data structures; (3) obtain training sets for training the neural network; (4) preprocess the training data; (5) train the network using the training data; (6) validate the training of the neural network; and (7) evaluate the performance of the neural network.

Figure 6C:
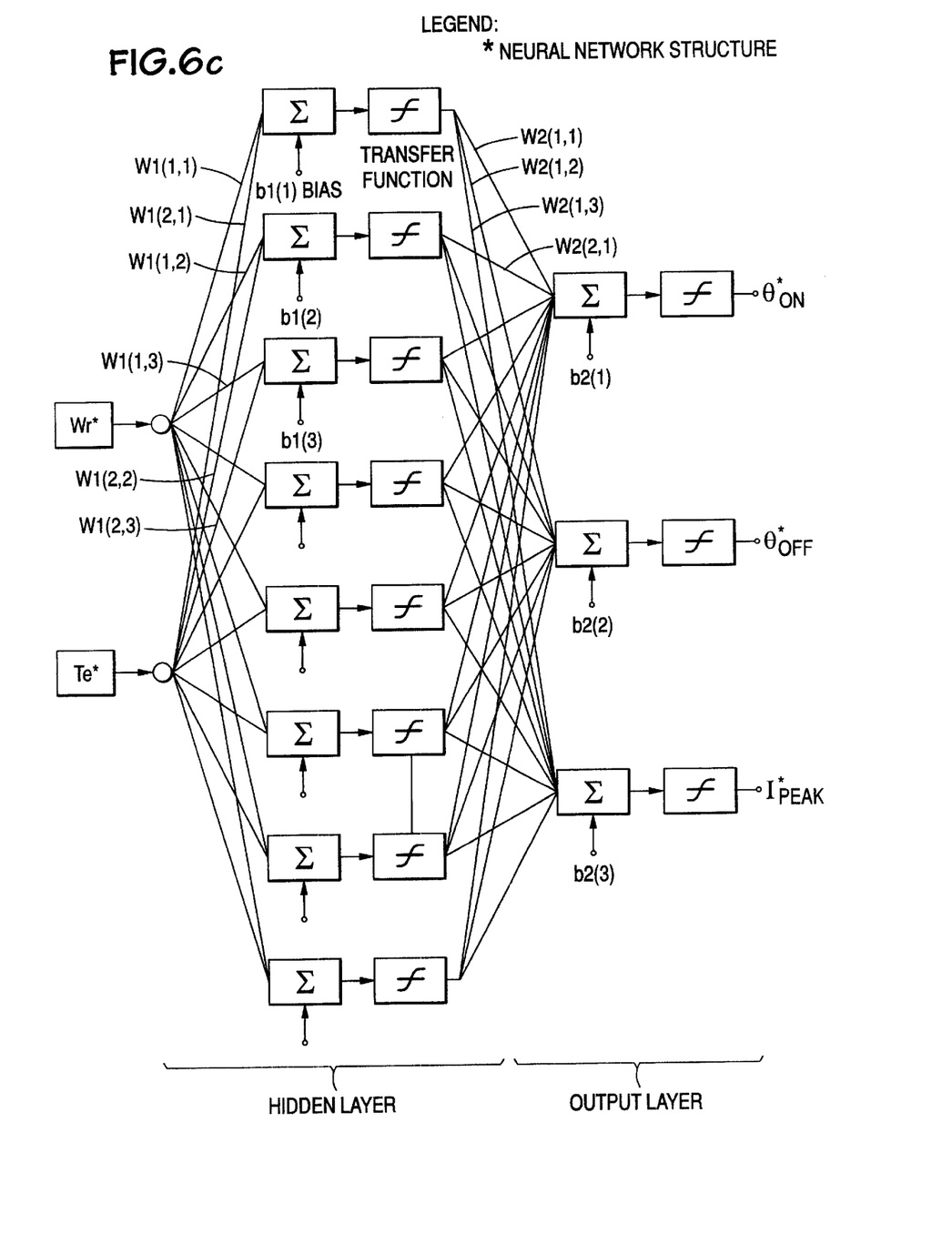

The structure of the neural network should be based on the evaluation of various candidate topologies and various trials. For real-time control purpose, one preferred design utilizes a feedforward back-propagation network with two layers, i.e., one hidden layer and one output layer. One such neural network is illustrated in FIG. 6c. In the illustrated embodiment of FIG. 6c, there are only eight neurons in the hidden layer and three neurons in the output layer. Elements of a neuron include weights, a bias, a summer and a transfer function. The transfer functions utilized in neural network are the hyperbolic tangent sigmoid function and the linear function, for the neurons in the hidden layer and the ones in the output layer, respectively. Higher number of neurons (such as twelve neurons in the hidden layer) may give better modeling precision and further minimize the Mean Square Error on training data sets when compared to the network of FIG. 6c; however, for the control of a typical switched reluctance motor, the network of FIG. 6b can learn correctly off-line (for the training data used) and perform adequately on-line without the necessary overhead that would be required to implement a network having greater than eight neurons. The construction of a two layer neural network as described above will be within the ability of one of ordinary skill having the benefit of this disclosure.

While many training approaches may be used to train the neural network of FIG. 6c, one preferred method is a training method utilizing the Levenberg-Marquardt algorithm and multiple training data sets. Other training algorithms may be used such as the gradient descent with momentum approach, the conjugate gradient approach and the quasi-Newton approach.

The training data for training the neural network may be obtained from laboratory testing of a plurality of switched reluctance machines of potentially differing sizes and constructions. For example, one exemplary training data set may be obtained from two motors that are 10–15 HP (about 50 N.m thermally continuous torque at 1500 rpm), both in NEMA 215T industrial frame size. A more desirable approach, and one that would likely lead to a neural network more adapted to handle a variety of motor constructions and sizes would be to train the neural network utilizing data sets obtained from a number of differing switched reluctance machines having a number of different sizes and constructions. When a large number of machines are utilized to obtain test data which is then highly correlated with redundancy, rapid convergence during the training process may be enhanced by the following Principle Component Analysis: (i) orthogonalizing the obtained data sets; (ii) arranging the orthogonal components of the sets; and (iii) truncating those data points that contribute little to variations in the collected data.

Figure 7A:
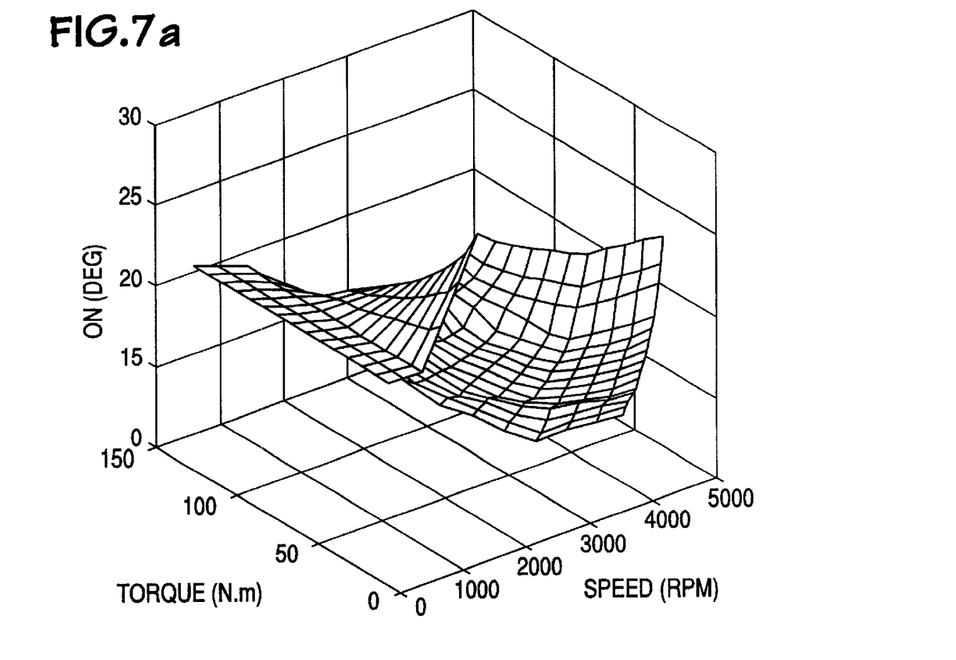
FIGS. 7a–7c illustrate one exemplary training data set that may be used to train the neural network of FIGS. 6a–6c.
Figure 7B:
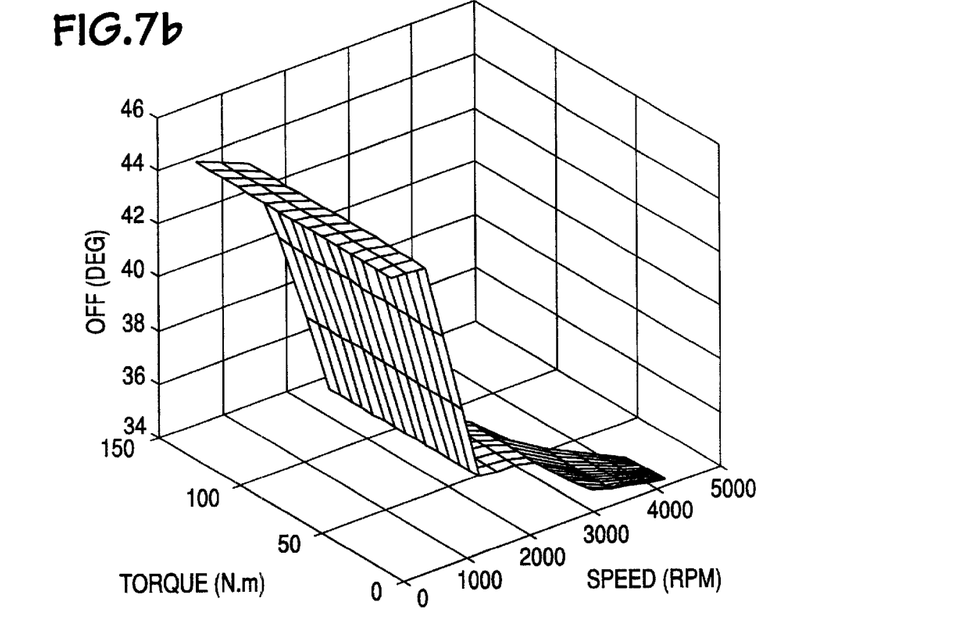
Figure 7C:
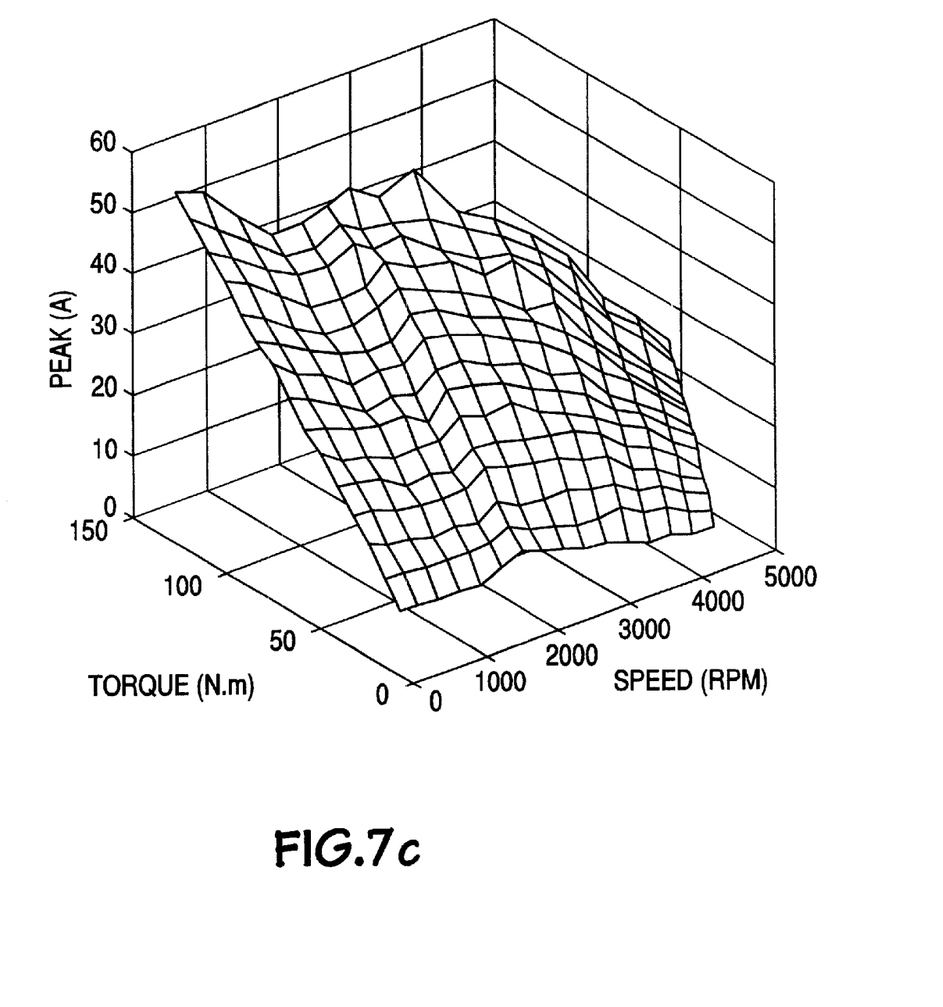

In general, the training data should be collected with the aim of modeling the relationship between the control inputs (i.e., turn-on angle, turn-off angle, peak current level) and the outputs (speed, torque). Because there are many possible combinations of the control inputs to obtain the same outputs, the sets of relationship that give maximum system efficiency should be collected throughout the speed and torque ranges to obtain a training data set. One exemplary training data set collected over such a range is illustrated in FIGS. 7a–7c which illustrate training data in terms of the speed/torque/turn-ON angle (FIG. 7a); the speed/torque/turn-OFF angle (FIG. 7b) and the speed/torque/peak current signal (FIG. 7c). Before the training process is performed, the training data may be preprocessed by sequencing and normalizing the raw test data to standard normalized values handled by the neural network.

With the training data, the trained neural network will exhibit a control characteristic that tends to optimize the system's efficiency. Likewise, the sets of relationship that give lowest torque ripples or lowest acoustic noises can be collected and used alternatively through the speed and torque ranges to obtain the training data set. System efficiency, torque ripples and acoustic noises are all measurable quantities representing motor performance.

In general, the neural network may be trained by first initializing the weights and biases of the network and then applying test data in the form of network inputs to generate network outputs. The weights and biases should then be adjusted to minimize the mean square error between the network outputs and the target outputs that are part of the test data. The gradient of the mean square error may be calculated utilizing backpropagation and the weights and biases may be adjusted to move in the direction of a negative gradient. The process of adjustment continues until the above mean square error falls within a small convergence limit.

Once a neural network is trained as described herein, it will not need to be retrained for different switched reluctance motor designs; however, the normalizing factors may need to be adjusted according to the ranges of the inputs and outputs as described earlier.

Once the network is trained, the operation of the system may be verified by utilizing the controller 14 containing the trained network to control a switched reluctance machine under the speed and torque conditions utilized to generate the test data, and under certain untested conditions due to the fact that the trained network has some limited ability of extrapolation. Dynamic performance can then be evaluated, including transient response, stability and robustness.

Figure 8:
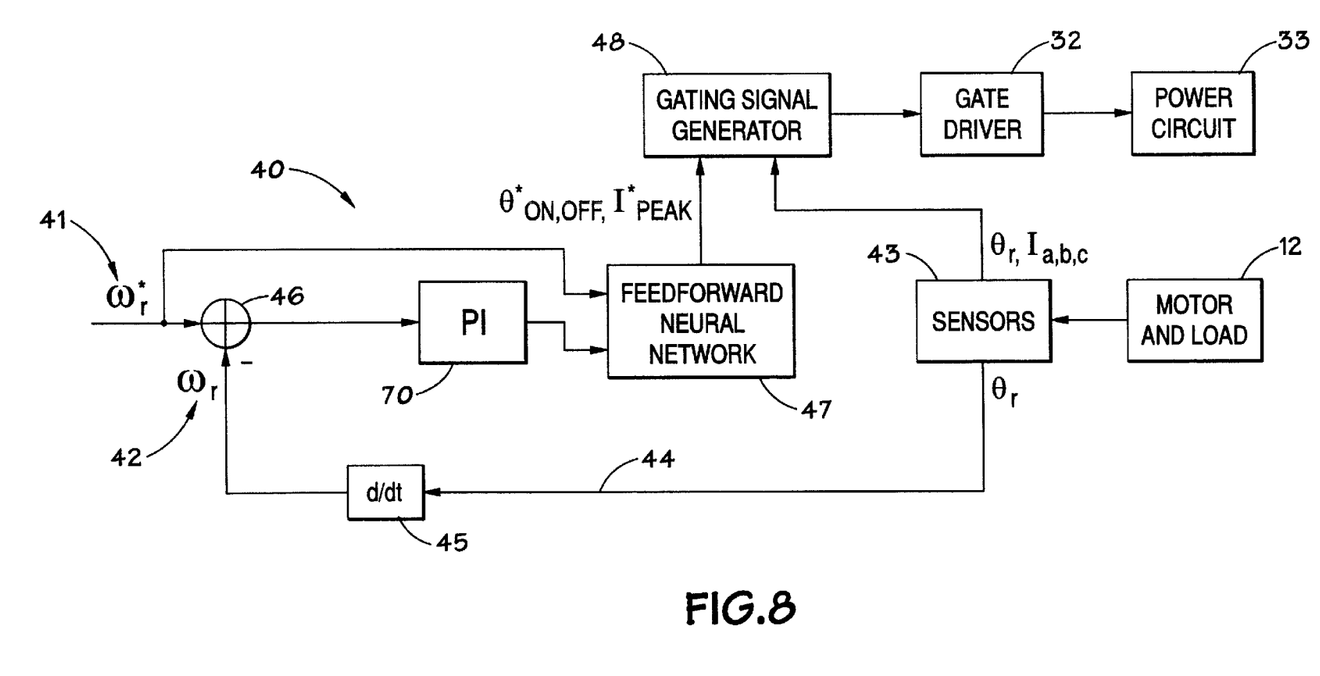
FIG. 8 illustrates a controller similar to that illustrated in FIG. 4 in which the fuzzy logic block is replaced with a conventional proportional-integral ("PI") block.

While the fuzzy-neural control system described above has many advantages over conventional controllers, alternate controllers are envisioned in which the fuzzy logic block 50 is replaced with a conventional proportional-integral ("PI") block that receives at its input the speed error signal and provides as output signal control signal that is the sum of a component proportional to the input and a component proportional to the integral of the input. An exemplary embodiment of such a controller, including PI block 70 is illustrated in FIG. 8. In the embodiment of FIG. 8, the neural network 47 should be trained using inputs like that provided by PI block 70.

Figure 9:
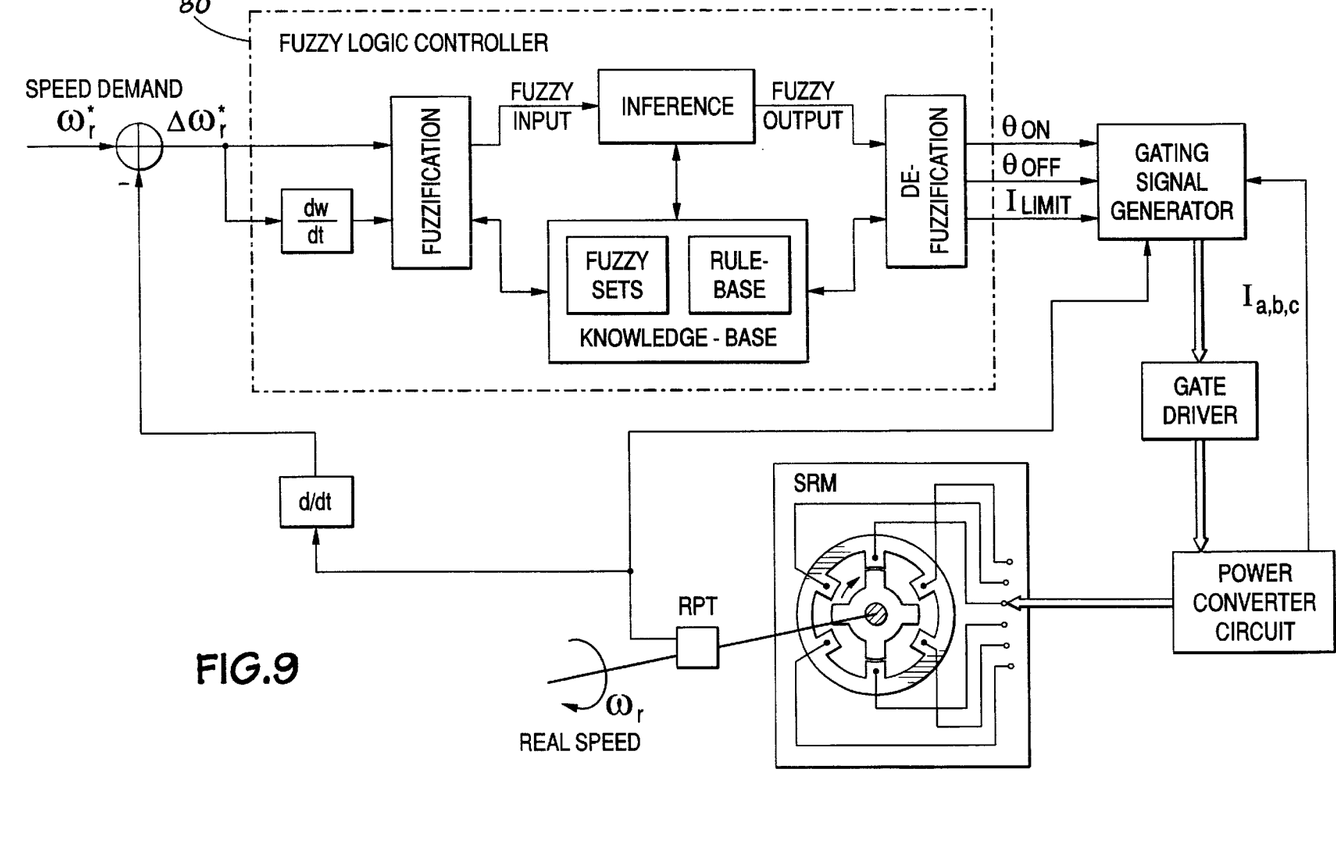
FIG. 9 illustrates a still further embodiment of the present invention comprising a controller for a switched reluctance machine that is similar to that illustrated in FIG. 4 but that does not utilize a neural network.

FIG. 9 illustrates a still further embodiment of the present invention comprising a controller for a switched reluctance machine that is similar to that discussed above in connection with FIG. 4 but that does not utilize a neural network. Instead, the system of FIG. 9 utilizes a fuzzy logic controller 80 alone to receive the speed error and speed error trend data and directly provide the turn-ON, turn-OFF and peak current control signals to the gating signal generator 48. Because the fuzzy logic controller 80 of FIG. 9 provides the turn-ON, turn-OFF and peak current control signals directly, it is important that the knowledge-base of the system 81 implement appropriate relationships between the inputs of the fuzzy logic controller and the outputs. In general, some relationships that may be implemented include the relationship that as the speed error and speed error trend signals are positive and large, the value of the peak current will increase, the value of the turn-ON angle will decrease and the value of the turn-OFF angle will increase (so as to produce larger torque). Another relationship that may be implemented is that as the speed error and speed error trend signals are negative and their absolute values are large, the value of the peak current will decrease, the value of the turn-ON angle will increase and the value of the turn-OFF angle will decrease so as to produce less torque. Still another relationship that may be implemented is that as the speed error and speed error trend signals remain approximately zero, the values of the peak current, turn-ON angle and turn-OFF angle will remain approximately unchanged. There are many other relationships in the similar format that indicate the relative values of the inputs and the degrees of increase or decrease of the outputs, such as "POSITIVE LARGE," "POSITIVE MEDIUM," "POSITIVE SMALL," "ABOUT ZERO," "NEGATIVE SMALL," "NEGATIVE MEDIUM," "NEGATIVE LARGE." The full fuzzy rule table contains all the relationships using the fuzzy variables representing such degrees of membership. The implementation of the rule table, membership functions and fuzzy data processing will be within the abilities of those of ordinary skill having the benefit of this disclosure.

The above description of several embodiments is made by way of example and not for purposes of limitation. The present invention is intended to be limited only by the spirit and scope of the following claims.

I claim as my invention:

1. A controller for a switched reluctance machine comprising:
   a fuzzy-logic control circuit that: (i) receives as an input a signal representing the difference between a desired operating characteristic of the switched reluctance machine and an actual operating characteristic of the switched reluctance machine; and (ii) provides at its output an intermediate control signal;
   a multi-layer neural network circuit that receives at its input the intermediate control signal from the fuzzy-logic control circuit and provides at its output control signals for controlling energization of the switched reluctance machine.

2. The controller of claim 1 wherein the fuzzy-logic control circuit and the neural network are implemented through appropriate programming of a digital processor.

3. The controller of claim 1 wherein the input signal representing the difference between a desired operating characteristic of the switched reluctance machine and an actual operating characteristic of the switched reluctance machine is a speed error signal representing the difference between the desired rotational speed of the machine and the actual rotational speed of the machine.

4. The controller of claim 3 wherein the fuzzy logic control circuit receives as a second input signal representing the trend in the speed error signal.

5. The controller of claim 4 wherein the output of the fuzzy logic controller is a signal corresponding to the desired output torque of the switched reluctance machine.

6. The controller of claim 1 wherein the neural network comprises:
   a front end tapped delay line to adaptively filter the input of the neural network and provide a filtered output signal.

7. The controller of claim 6 wherein the neural network further comprises a two-layer feed forward neural network that has been trained using a training data set derived from the operational characteristics of at least one switched reluctance machine.

8. The controller of claim 6 wherein the neural network has been trained using a training set derived from the operational characteristics of a plurality of switched reluctance machines having different sizes and operating characteristics.

9. The controller of claim 6 wherein the neural network comprises an eight neuron hidden layer and a three neuron output layer.

10. The controller of claim 1 wherein the neural network receives as an input, in addition to the intermediate control signal from the fuzzy-logic control circuit, a signal representing the desired operating characteristic of the switched reluctance machine.

11. The controller of claim 1 wherein the neural network further receives as an input a signal representing the actual operating characteristic of the switched reluctance machine.

12. The controller of claim 1 wherein the output control signals from the neural network define at least one control angle for controlling the switched reluctance machine.

13. A controller for a switched reluctance machine comprising:
   a proportional-integral control circuit that receives as an input a speed error signal representing the difference between the desired operating speed of the switched reluctance machine and the operating speed of the switched reluctance machine, the proportional-integral controller providing output signals that are proportional to the sum of a component proportional to the intergral of the input and a component proportional to the input; and
   a multi-layer neural network circuit that receives at one input the outputs from the proportional-integral control circuit, the neural network providing at its output control signals for controlling energization of the switched reluctance machine.

14. The controller of claim 13 wherein the neural network receives as an input, in addition to the outputs from the proportional-integral controller, a signal representing the desired operating speed of the switched reluctance machine.

15. The controller of claim 13 wherein the neural network receives as an input, in addition to the outputs from the proportional-integral controller, a signal representing the actual operating speed of the switched reluctance machine.

16. The controller of claim 13 wherein the neural network comprises a front end tapped delay line to adaptively filter the input of the neural network.

17. The controller of claim 13 wherein the neural network comprises a two-layer feed forward neural network having an eight neuron hidden layer and a three neuron output layer.

* * * * *

UNITED STATES PATENT AND TRADEMARK OFFICE
CERTIFICATE OF CORRECTION

PATENT NO. : 6,442,535 B1
DATED : August 27, 2002
INVENTOR(S) : Tang Yifan

It is certified that error appears in the above-identified patent and that said Letters Patent is hereby corrected as shown below:

<u>Title page,</u>
References Cited, U.S. PATENT DOCUMENTS, please insert:

| | | | |
|---|---|---|---|
| -- 5,739,663 | 04/14/98 | Brown | 318/701 |
| 5,654,836 | 08/05/97 | Oh | 360/70 |
| 5,652,494 | 07/29/97 | Sugden | 318/701 |
| 5,650,779 | 07/22/97 | Sugden | 341/9 |
| 5,621,288 | 04/15/97 | Seki et al. | 318/431 |
| 5,602,544 | 02/11/97 | Takahashi et al. | 341/6 |
| 5,563,488 | 10/08/96 | Stephenson et al. | 318/701 |
| 5,545,964 | 08/13/96 | Stephenson et al. | 318/701 |
| 5,491,391 | 02/13/96 | Bahr et al. | 318/39 |
| 5,469,039 | 11/21/95 | Stephenson et al. | 318/701 |
| 5,457,371 | 10/10/95 | Gordon | 318/661 |
| 5,382,889 | 01/17/95 | Peters et al. | 318/254 |
| 5,216,651 | 06/01/93 | Hwang | 369/44.28 |
| 5,202,616 | 04/13/93 | Peters et al. | 318/254 |
| 5,202,614 | 04/13/93 | Peters et al. | 318/254 |
| 5,196,775 | 03/23/93 | Harris et al. | 318/638 |
| 5,013,988 | 05/07/91 | Sakano | 318/602 |
| 4,980,839 | 12/25/90 | Souji et al. | 364/513 |
| 4,870,559 | 09/26/89 | Hyatt | 364/130 -- |

FOREIGN PATENT DOCUMENTS, please insert:
-- 0534761 A1     09/24/92     EPO     H02P     7/00 --

UNITED STATES PATENT AND TRADEMARK OFFICE
CERTIFICATE OF CORRECTION

PATENT NO. : 6,442,535 B1
DATED : August 27, 2002
INVENTOR(S) : Tang Yifan

It is certified that error appears in the above-identified patent and that said Letters Patent is hereby corrected as shown below:

<u>Title page, (cont.),</u>
OTHER PUBLICATIONS, please insert:
-- Tauler T. Borges, et al., "An Application of Fuzzy Logic For Reluctance Motor Drive," 1997, IEEE; 3 pages O. Frank Bay, et al., "Fuzzy Logic Based Control of a Switched Reluctance Drive;" 5 pages P.H. Chappell et al., Microprocessor Control of a Variable Reluctance Motor," IEEE Proceedings, Vol. 131, March 1984, pages 51-60

Hong-Je Ryoo et al., "The Speed Control of the Switched Reluctance Motor Using Fuzzy PI Controller", 1996, pages 209-216 --

Signed and Sealed this

Tenth Day of June, 2003

JAMES E. ROGAN
*Director of the United States Patent and Trademark Office*